(12) United States Patent
Frazier

(10) Patent No.: US 9,582,590 B2
(45) Date of Patent: Feb. 28, 2017

(54) METHOD AND SYSTEM FOR PRESENTING A NAVIGATION PATH FOR ENABLING RETRIEVAL OF CONTENT

(75) Inventor: Kristopher T. Frazier, Frisco, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1827 days.

(21) Appl. No.: 12/979,566

(22) Filed: Dec. 28, 2010

(65) Prior Publication Data

US 2012/0166961 A1   Jun. 28, 2012

(51) Int. Cl.
*G06F 17/30* (2006.01)

(52) U.S. Cl.
CPC .............. *G06F 17/30873* (2013.01)

(58) Field of Classification Search
CPC .... G06F 3/0481; G06F 3/0484; G06F 3/0482; G06F 17/30994; G06F 17/2247; G06F 17/30861; G06F 17/30; G06F 17/30864
USPC ... 715/738, 854, 853, 39; 707/E17.116, 107, 707/999.003, 108
See application file for complete search history.

(56) References Cited

U.S. PATENT DOCUMENTS

| | | | | |
|---|---|---|---|---|
| 5,870,559 A * | 2/1999 | Leshem et al. | ............... | 709/224 |
| 5,958,008 A * | 9/1999 | Pogrebisky et al. | .......... | 709/223 |
| 6,144,962 A * | 11/2000 | Weinberg et al. | | |
| 6,189,024 B1 * | 2/2001 | Bauersfeld et al. | .......... | 709/203 |
| 6,633,316 B1 * | 10/2003 | Maddalozzo et al. | ........ | 715/854 |
| 6,920,505 B2 * | 7/2005 | Hals et al. | .................... | 709/238 |
| 7,225,407 B2 * | 5/2007 | Sommerer et al. | ........... | 715/738 |
| 7,831,582 B1 * | 11/2010 | Scofield et al. | ............. | 707/706 |
| 8,140,579 B2 * | 3/2012 | Li et al. | ........................ | 707/791 |

OTHER PUBLICATIONS

MemoSpace: a visualization tool for web navigation, Waniek et al., 2005.*

* cited by examiner

*Primary Examiner* — Matthew Ell

(57) ABSTRACT

An approach for enabling presentment of a navigation path as performed by a user over a network to facilitate rapid acquisition of content is described. A navigation path representing one or more sequences of resource identifiers that are related based on selection information provided by a user in navigating, via a browser application is presented. The navigation path is presented to permit direct selection of one of the resource identifiers of the one or more sequences for acquiring content associated with the selected resource identifier.

18 Claims, 13 Drawing Sheets

100

304

300

314

METHOD AND SYSTEM FOR PRESENTING A NAVIGATION PATH FOR ENABLING RETRIEVAL OF CONTENT

BACKGROUND INFORMATION

Internet ready computing devices, such as mobile phones, smartphones and laptops, are indispensible tools, providing convenient on-demand access to information for users. For example, a number of such devices feature browsers or web portal applications that allow users to perform information searches, visit websites featuring content of interest or even retrieve and execute certain content including audio and video data. A particular page of a website visited by a user may feature several embedded links, anchors, clickable media tags, uniform resource locators (URLs) and other resource identifiers for enabling a user to navigate to different content. Hence, in the process of using the browser, a user may navigate to several different pages along the way as they attempt to identify content of interest. In other instances, the user may digress and end up accessing content of a completely different nature referenced by an unexpected resource identifier (e.g., URL). Unfortunately, there is no convenient way to enable a user to view the specific navigation path they engaged during prior web browser use so that they may quickly recall content of interest.

Based on the foregoing, there is a need for effective, convenient for enabling presentment of a navigation path as performed by a user over a network to facilitate rapid acquisition of content.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for enabling presentment of a navigation path to facilitate rapid acquisition of content, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
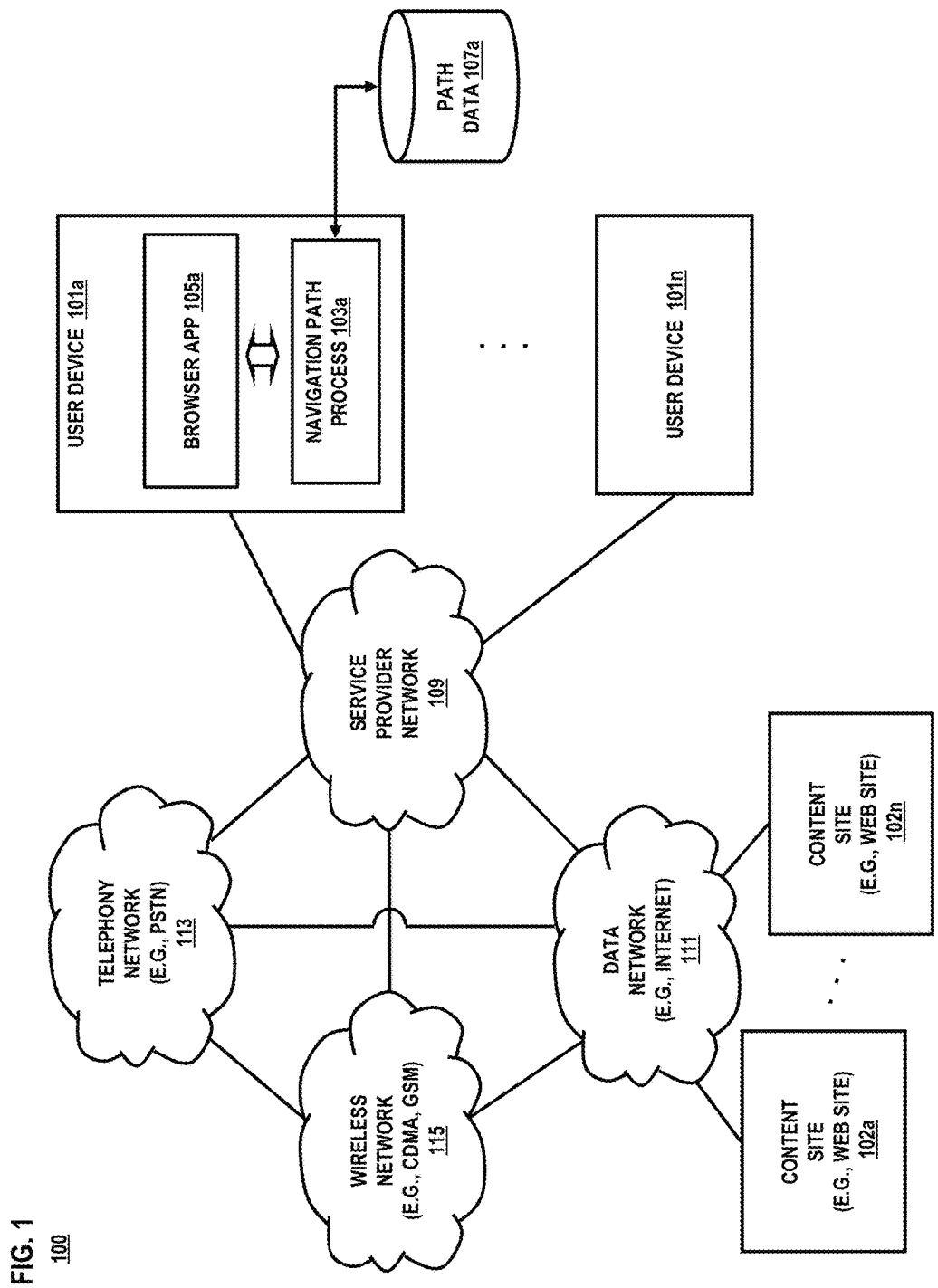
FIG. 1 is a diagram of a system for enabling presentment of a navigation path as performed by a user over a network to facilitate rapid acquisition of content, according to one embodiment.

FIG. 1 is a diagram of a system for enabling presentment of a navigation path as performed by a user over a network to facilitate rapid acquisition of content, according to one embodiment. For the purposes of explanation, system 100 is shown to include one or more user devices 101a-101n (e.g., mobile device, smartphone, netbook, etc.), which are configured to retrieve content from various sources, including one or more content sites 102. Communications and/or associated requests with these content sites 102 are tracked using a navigation path process 103 by way of a communication network (e.g., service provider network 109). The navigation path processes 103a-103n (of which, only one is shown) provide resource identifier tracking services for these devices 101a-101n. In addition, the navigation path process 103 maintains path data, which may include the values of the resource identifiers, metadata associated with acquired content, sequence information regarding the resource identifiers, drill down levels (i.e., the level of depth of related resource identifiers for accessing specific content) and other like data. By way of example, content sites 102a-102n are web sites, and are accessed using a browser application—e.g., any one of browser applications 105a-105n. As a user "surfs" these web sites 102a-102n, the navigation path process 103a stores the corresponding identifiers, e.g., uniform resource locators (URLs) within a database (or memory) 107a.

In certain embodiments, a "resource identifier" pertains to any value or data for indicating the location, whereabouts, mode of access or means of retrieval of content from over a network. By way of example, a resource identifier may include an embedded link within a web page, anchors or tags encoded within a web page, clickable media tags, uniform resource locators (URLs), uniform resource names (URNs), digital object identifiers (DOIs), persistent uniform resource locator (PURLs), extensible resource identifier (XRIs) and other resource locator value or reference for enabling a user to retrieve different content. For the purpose of example, a resource identifier may point to or identify a specific location of "content" such as a webpage comprising various textual data (e.g., search results, a company website, intranet data), an audio or video file, a multimedia clip, an executable script (e.g., Java™ Script) and various retrievable documents. Of note, content such as a web page may itself include various resource identifiers for referencing other content.

In certain embodiments, user devices 101a-101n, and in particular, wireless communication devices or network ready computes such, feature browser applications 105a-105n or web portals that allow users to perform information or content searches, access a webpage featuring various content or execute various applications and web services. Typically, when a user decides to navigate for content within a public data network (e.g., the global Internet) by way of their browser 105a-119n, the user may start the navigation at a point of origination such as a homepage of web site 102a. By way of example, the homepage is referenced by a specific resource identifier, and may include content to be viewed such as pictures and text as well as content to be accesses such as additional resource identifiers (e.g., tags, URLs); the content being accessed by way of the resource identifier through execution of a mouse click or other selection means. Alternatively, the user can type the resource identifier directly into a dedicated data entry field of the web browser application 105a. In either case, the user is bound to select several resource identifiers, in various sequences, as the user navigates via the content site to retrieve different content. This series of resource identifiers and their various sequences from a point of origination to an end point of reference to a specific set of content, in certain embodiments, pertains to a "navigation path."

In some instances, the user may be intent on retrieving content of a particular nature or context as they navigate, but may end up retrieving entirely different or loosely related data. By way of example, when a user accesses a search engine website (e.g., site 102a) for retrieving data about "Dog Toys," the results may be shown as a list of content and associated resource identifiers for linking the user to further data related to the topic. One result may include a caption and associated resource identifier such as "World's best toys for dogs!—www.example1.com," another "ACME Pet store Dog Toys.—www.acmeexample.com" and another "Dog clothes for your best friend.—www.acmedogfood.com." Though the user may have intended to identify resources regarding dog toys, they may find the link regarding "dog clothes" compelling and select the corresponding resource identifier. Under this scenario, this may further lead to the accessing of other resource identifiers along the way, such as content regarding dog grooming, pet care and other data.

If the user, at a later time, wishes to recall the resource identifiers they accessed during a prior browser session so that they can retrieve content of particular interest, the user has few options. One option is to toggle through a history listing to see if the specific resource identifier of interest can be found. Another option is to redo the search, starting with the entry of "Dog toys" into the search engine, then attempt to remember and retrace the navigational path that was taken the first time that led to the desired content. Both options, while capable of being performed, are time consuming and cumbersome for the user. Furthermore, these approaches to recalling prior viewed content do not lend themselves to enabling the user to readily recall the navigational path— i.e., sequence of resource identifiers traversed along the way for rendering specific content. Even when the browser maintains a list of prior visited resource identifiers as in the form of a history listing, the list does not adequately depict the interrelations between respective identifiers nor does it convey the movement or sequence of identifiers (e.g., web pages) accessed by the user over time during a distinct browsing session. Unfortunately, there is no convenient, efficient way to enable a user to view the navigation path associated with a prior web browser usage session. Traditional mechanisms do not permit quickly pointing to (e.g., "jump to") content of interest.

To address this issue, the navigation path process 103a for enabling dynamic tracking of resource identifiers and their interrelationships (e.g., how one resource identifier references another). By way of example, the process 103a can provide various functions for enabling the browser application 105a to present a visual or textual representation of the navigation path along with an indication of the appropriate sequence of the resource identifiers constituting the path. The process 103, according to one embodiment, enables any one of the user devices 101a-101n to generate a data view, such as by way of the browser applications 105a-105n, of the navigation path exercised by a given user during a certain period of time (e.g., yesterday, today, one week ago) or with respect to a particular browsing session. In one embodiment, the navigation path process 103 can be offered by a service provider as a managed or hosted solution, whereby such process 103 is downloaded from an application server (not shown).

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, netbook or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, user devices 101a-101n employs a service provider network 109 to access other systems and networks—namely data network 111. As such, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

Figure 2:
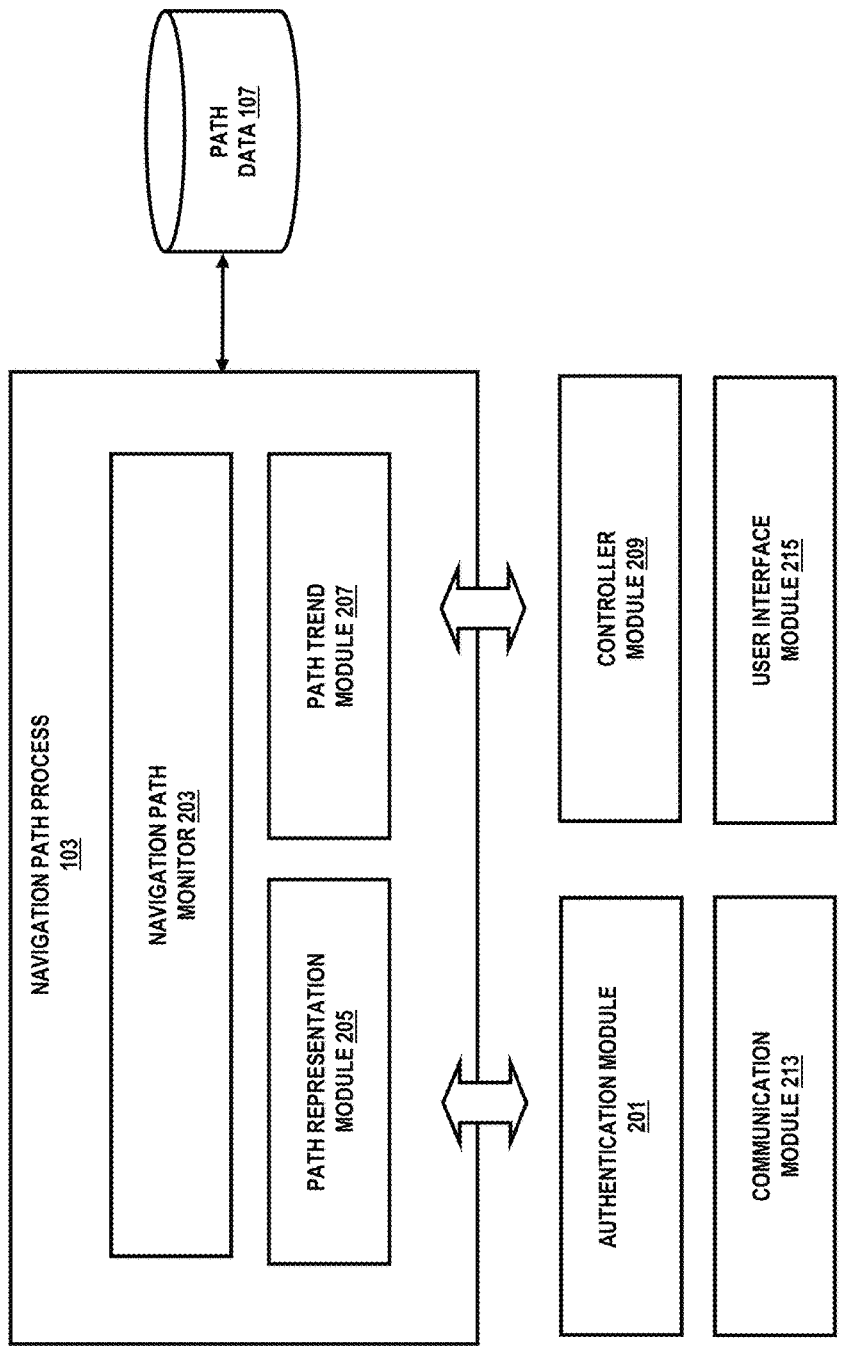
FIG. 2 is a diagram of a navigation path platform used in the system of FIG. 1, according to one embodiment.

FIG. 2 is a diagram of a navigation path platform used in the system of FIG. 1, according to one embodiment. Process 103 includes various executable modules for performing one or more computing, data processing and network based instructions that in combination provide tracking and presentation of navigation paths associated with traversing content sites. Such modules can be implemented in hardware, firmware, software, or a combination thereof, and interact with other modules or components of a user device (e.g., device 101a). By way of example, user device 101a may include an authentication module 201 that interfaces with the navigation path management process 103. This process 103, as shown, may include navigation path monitor 203, path representation module 205, and path trend module 207. Additionally, user device 101a can include a controller 209, a communication module 213 and an user interface module 215. According to one embodiment, the navigation path process 103 also maintains path data at database 107; the data can be acquired during a browsing session by user device 101a, and include path trend data for indicating user navigation trends.

In one embodiment, the authentication module 201 authenticates users and user devices 101a-101n for interaction with the navigation path process 103 to provide privacy settings with respect to the tracking functions. By way of example, the authentication module 201 receives a request, by the user or another application, to instruct the process 103 to track and present navigational paths. The subscription process may include enabling the user's browser applications 105a-105n to be configured for execution with respect to the navigation path process 103. For instance, the navigation path process 103 may be configured as a toolbar option or executable button, wherein respective features and functions of the process 103 are invoked by way of the browser applications 105a-105n. The authentication module 201 may present the user device 101a-101n with an executable to be run by the user device 103a for installment of software (e.g., a navigation path viewer) to be integrated with the browser applications 105a-105n.

In one embodiment, the navigation path monitor 203 observes and records the various resource identifiers (e.g., URL entries) navigated to by the user as they execute a browser applications 105a-105n. In addition, the navigation path monitor 203 also maintains sequence information regarding various resource identifiers accessed, as well as drill down information. Hence, the navigation path monitor 203 is operable during any browsing session engaged by the user for enabling path tracking. The tracking process may be triggered by startup of the browser application 105, entry of a resource identifier such as a URL into a data entry field of the browser application 105, initialization of a search, or any other interaction caused by the user during browser use.

"Sequence information," in certain embodiments, specifies the order of access of resource identifiers by the user during a browsing session. The sequence information can be utilized to convey how resource identifiers were accessed in a sequential manner, or in some instances, simultaneously, as the user navigates from a point of origination (e.g., a starting web page) to an end point (e.g., a final web page). It is noted that time and date information for indicating a specific instance of access of a given resource identifier may be appropriately recorded as or in addition to the sequence information. Also, in certain embodiments, "drill down information" pertains to the level of depth or distance from one resource identifier to another. By way of example, if a user must clicks on several different links, tags, URLs, etc. to acquire content of interest, then x−1 drill downs are recorded. Generally, at least one or more sequences of resource identifiers are required to formulate a navigation path.

It is noted that drill down information and sequence information may be particularly useful for representing the interrelationships between successively accessed resource identifiers. Hence, the monitor 203 is able to track sequences that begin at different ones of the drill-down levels and include at least one non-common resource identifier. By way of this approach, the navigation path monitor 203 can recognize, for example, URLs or links that reference entirely different websites; thus enabling related URLs, links, tags or anchors and other resource identifiers to be distinguished from unrelated ones.

The navigation path monitor 203 maintains data regarding the above described browser activity in the path database 107a. It is noted that the start point, end point, drill down information and sequence information may be stored to the path database 107a along with some content or metadata thereof. The metadata may provide descriptive information regarding the content, statistics relating to the content, tag information, cookies and other data.

In one embodiment, a path representation module 205 processes the path data 103a as gathered by the navigation path monitor 203 in order to generate a representation of the navigation path. By way of example, the path representation module 205 analyzes the gathered resource identifiers, and their associated sequences and drill down levels, for generating a visual or textual depiction of the navigation path. The visual or textual depiction is generated to indicate the interrelations between respective resource identifiers as well as data for describing particular content associated with a resource identifier. The depiction may include various nodes for representing a specific resource identifier, route indicators for representing a path from one identifier to another, metadata for describing the resource identifiers, time and date information for indicating a time period of access of content and other information. In addition, the path representation module 205 operates in connection with the user interface module 215 to enable presentment of a data view (e.g., a path viewer) for displaying the navigation path.

It is noted that the navigation path may be caused for presentment by the path representation module 205 in response to invocation of the browser application 105 or upon receipt of a request (e.g., by the user) during a browsing session. In the latter example, the request may be received by way of user selection of an action button from the browser application, wherein the action button triggers a data view for displaying the navigation path. Alternatively, the path representation module 205 may be configured to generate the data view independent of the browser application 105, i.e., as a separate pop-up window or through a login process/user interface of the navigation path process 103.

Also, the path representation module 205 may also be configured to enable presentment of the navigation path in an expanded or collapsed view. The expanded view may correspond to a full, graphical depiction of the navigation path that includes all of the various interrelated resource identifiers traversed during a browsing session by the user. The collapsed view may correspond to an abbreviated or textual representation of the navigation path. More regarding presentment of the navigation path, such as in connection with user operation of a browser application 105 will be described more fully with respect to FIGS. 5A-5F.

In one embodiment, the path trend module 207 generates data for indicating the navigation path trends and patterns of the user. By way of the example, the path trend module 207 may analyze the path data 103a as generated by the navigation path monitor 203 over time. Based on this historical data set, as well as various trend analysis models or algorithms, various statistics and metrics may be generated for characterizing or predicting further navigational tendencies of the user. This data may be further stored as path trend data, and maintained in association with a specific profile of the user as maintained in the registration database. Path trend data may then be subsequently analyzed by the service provider or content providers for developing refined search engine optimization techniques, directing target advertisements to users, enhancing user query results and the like. It is contemplated that the path trend data for various subscribers to the navigation path process 103 may be analyzed individually, for application to a specific subscriber, or in aggregate for application to a group of subscribers.

In one embodiment the user interface module 215 enables presentment of a graphical user interface for presenting a navigation path (e.g., a data view for displaying a representation of the navigation path). By way of example, the user interface module 215 generates the interface in response to application programming interfaces (APIs) or other function calls corresponding to the browser applications 105*a*-105*n* or web portal application of the user devices 101*a*-101*n* for enabling the display of graphics primitives. Of note, the user interface module 215 may operate in connection with the path representation module 205 to permit the retrieval of content through access of a resource identifier.

In one embodiment, a communication module 213 enables formation of a session over a network 109 between the navigation path process 103 and the browser application 105 or web portal via the user interface. By way of example, the communication module 213 executes various protocols and data sharing techniques for enabling collaborative execution between a subscriber's user device 101*a*-101*n* (e.g., mobile devices, laptops, smartphones, tablet computers, desktop computers) and the navigation path process 103 over the network 109. It is noted that the communication module 213 is configured to support a browser session—i.e., the retrieval of content as referenced by a resource identifier during a specific period of time or usage of the browser. The browser session may support execution of an internet search, web page upload, multimedia playback and other functions.

Also, in one embodiment, a controller module 209 is configured to regulate the communication processes between the various other modules. For example, the controller module 209 generates the appropriate signals to control the communication module 213 for facilitating transmission of data over the network 109. Also, while not shown, the controller module 209 may access various monitoring systems for regulating operation of the navigation path process 103. This may include systems for detecting current data traffic levels, error conditions, data exchange rates, network latencies, resource allocation levels and other conditions associated with the operation of the navigation path process 103, such as to ensure its effective use respective to a browser application 105.

Figure 3B:
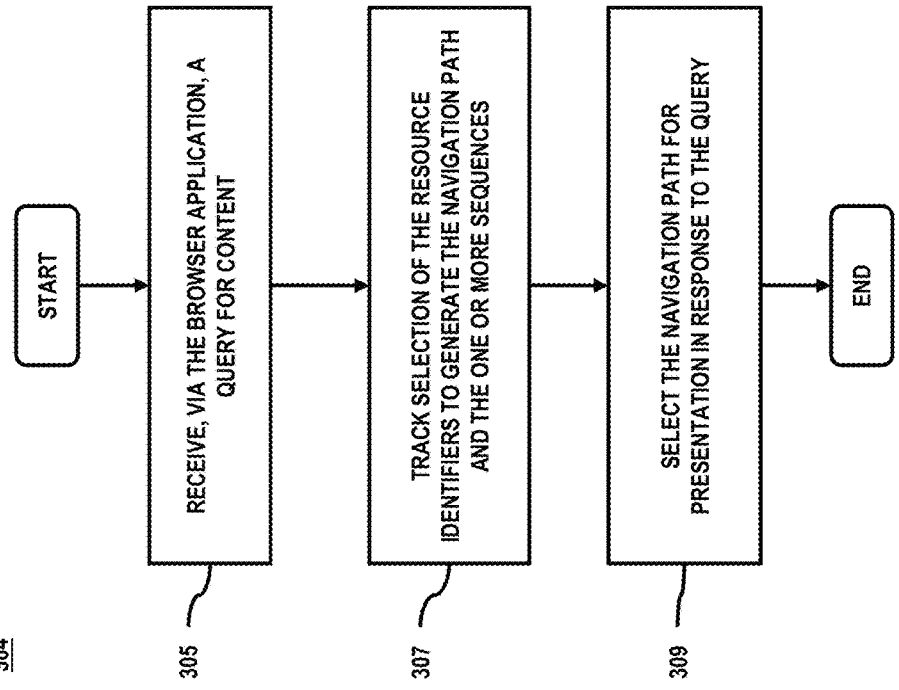
FIGS. 3A-3C are flowcharts of a process for presenting a navigation path, according to various embodiments.
Figure 3A:
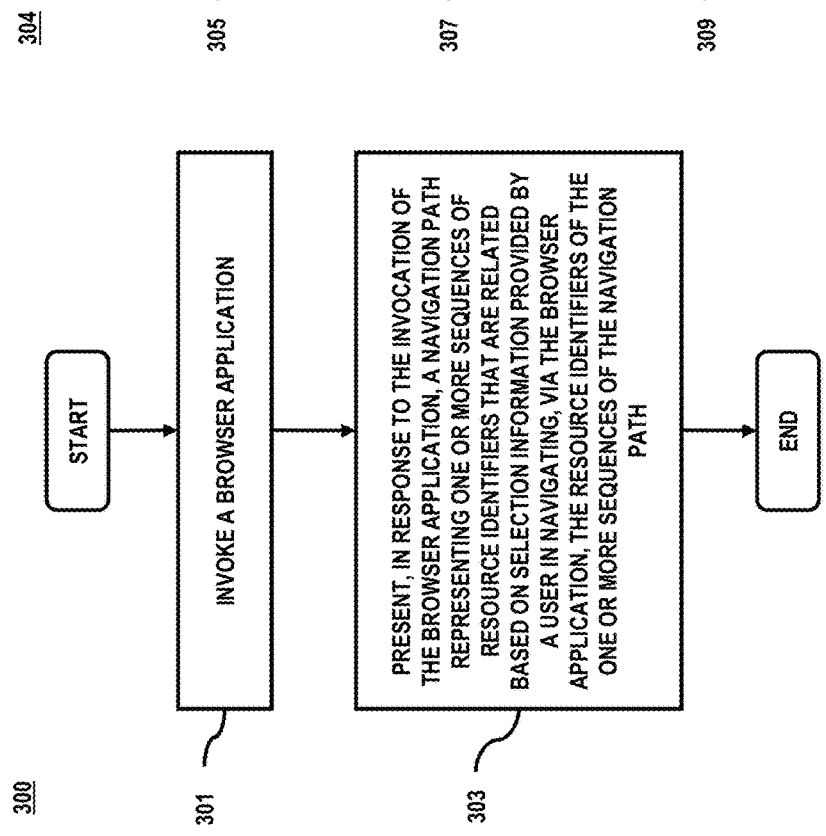
Figure 3C:
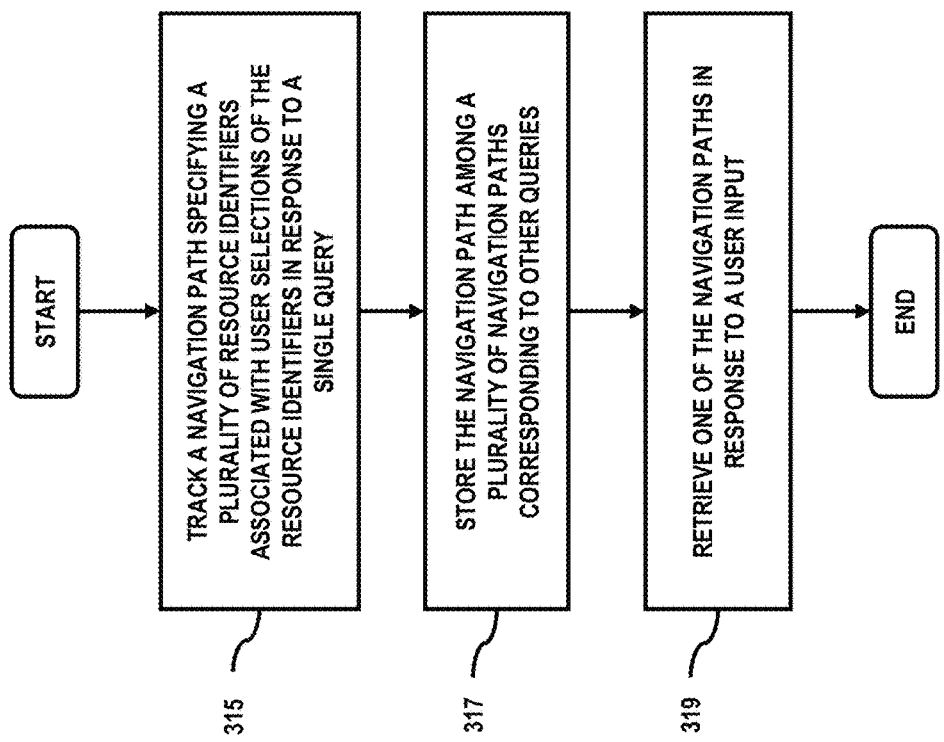

FIGS. 3A-3C are flowcharts of a process for enabling presentment of a navigation path facilitate rapid acquisition of content, according to various embodiments. For the purpose of illustration, the processes are described with respect to FIG. 1. It is noted that the steps of the process may be performed in any suitable order, as well as combined or separated in any suitable manner. In step 301 of process 300, a browser application 105*a* is invoked at the user device 101*a*. Per step 303, in response to the invocation of the browser application 105*a*, a navigation path is presented to the user interface of the device 101*a*-101*n*. As mentioned previously, the navigation path represents one or more sequences of resource identifiers. This sequence of identifiers may be related to one another based on selection information provided by a user during navigation of said resource identifiers during a prior browsing session.

In step 305 of process 304 (FIG. 3B), a request for query of the content is received by the navigation path process 103 by way of the browser applications 105*a*-105*n*. In another step 307, the navigation path process 103 tracks selection of the resource identifiers to generate the navigation path and the one or more sequences. Per step 309, the navigation path is selected for presentation in response to the query. It is noted that presentment may occur in a separate pop-up window or in a frame, menu or other module integrated within the browser applications 105*a*-105*n*.

In step 315 of process 314 (FIG. 3C), the navigation path process 103 tracks a navigation path specifying multiple resource identifiers associated with user selections of the resource identifiers in response to a single query (e.g., search query). Of note, the query may include a request for specific content, content pertaining to a search result set, or a combination thereof. Per steps 317 and 319 respectively, the navigation path is stored (e.g., database 107) among other navigation paths corresponding to other queries and retrieves one of the navigation paths in response to a user input.

Figure 4:
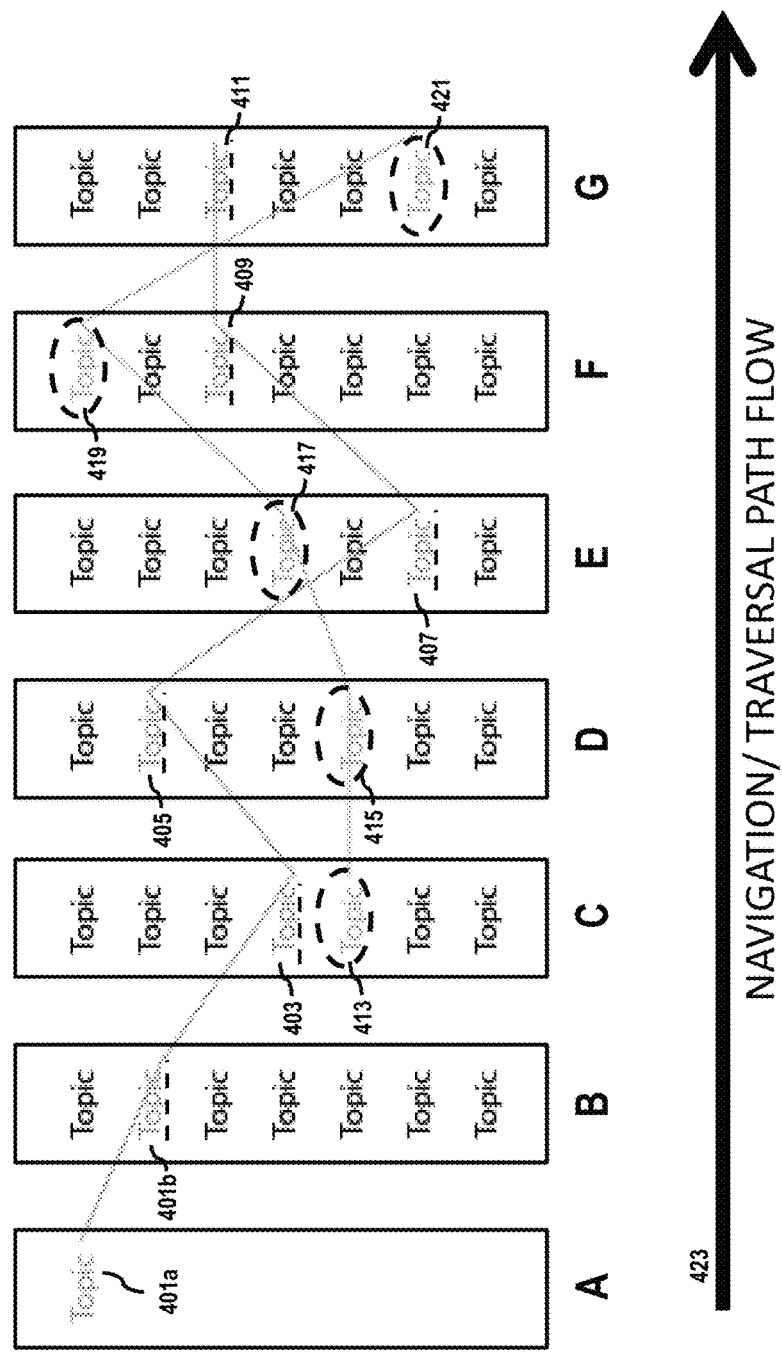
FIG. 4 is a diagram of exemplary navigation paths generated as a result of a user traversing various resource identifiers using a browser application, according to one embodiment.

FIG. 4 is a diagram of exemplary navigation paths generated as a result of a user traversing various resource identifiers using a browser application, according to one embodiment. For the purposes of explanation, the navigation paths are presented from the perspective of a user conducting a search, such as by way of a search engine. The direction of navigation/traversal as a result of this search is depicted by arrow 423.

A search engine (not shown), accessible from a web page (or site) A that is referenced by a distinct resource identifier (e.g., uniform resource locator (URL)), may direct the user to subsequent resource identifiers upon entry of a search term. By way of example, the resource identifiers are shown herein as being representative of various topics of potential interest to the user. Thus, when the user enters the search term (e.g., "Topic 401*a*"), a web page (or site) B is generated/retrieved that contains several additional "Topics" (resource identifiers) pertaining to the search. The user selects "Topic" 401*b* through "Topic" 411 over time as they navigate to identify content of interest. Thus, under this scenario, the navigation path is observed as a sequence of user selected reference identifiers ("Topics") occurring as the user traverses from an origination point 401*a* at web page A to an endpoint 411 at web page G. The navigation path is represented visually by the lines connecting "Topics" 401*a*-411, and corresponds to an initial navigation path.

A secondary navigation path is also shown, by way of example. At web page C, the user may have selected another "Topic" 413 that happened to capture the user's interest. This topic may or may not have been related to the original topic ("Topic" 401*a*) that characterized the initial search, i.e., the user digressed. As such, the user selects "Topic" 413 through "Topic" 421 over time as they navigate to identify content of interest pursuant to an origination point 413 at web page C to an endpoint 421 at web page G. The secondary navigation path is represented visually by the lines connecting "Topics" 413-421, and is distinctly different from the initial navigation path.

It may be observed, by way of this example that if the user were to reconstruct these paths at a later browsing session, they may be presented with the entire domain of search results (resource identifiers/"Topics" thereof) generated over the course of browser execution. Furthermore, in the case where the user digressed, they may be able to identify interrelations between resource identifier/"Topics," such as in the case of web page C, which contains two topics 403 and 413 that comprise respective navigation paths. This execution is further explained below in FIGS. 5A-5F.

FIGS. 5A-5F are diagrams of a user interface for enabling presentment of a navigation path as performed by a user over a network to facilitate rapid acquisition of content, according to various embodiments. For the purpose of illustration, the diagrams are described with respect to an exemplary user case of a user accessing content through use of a browser application. In the examples as shown, the navigation path process 103 may interact with a browser application 500 for tracking the user selected resource identifiers. It is noted that while the user interface depictions correspond to the process of navigation tracking and presentment, different user devices 101a-101n may be configured to cause presentment of various additional screens based on interaction of devices with the process 103.

Figure 5A:
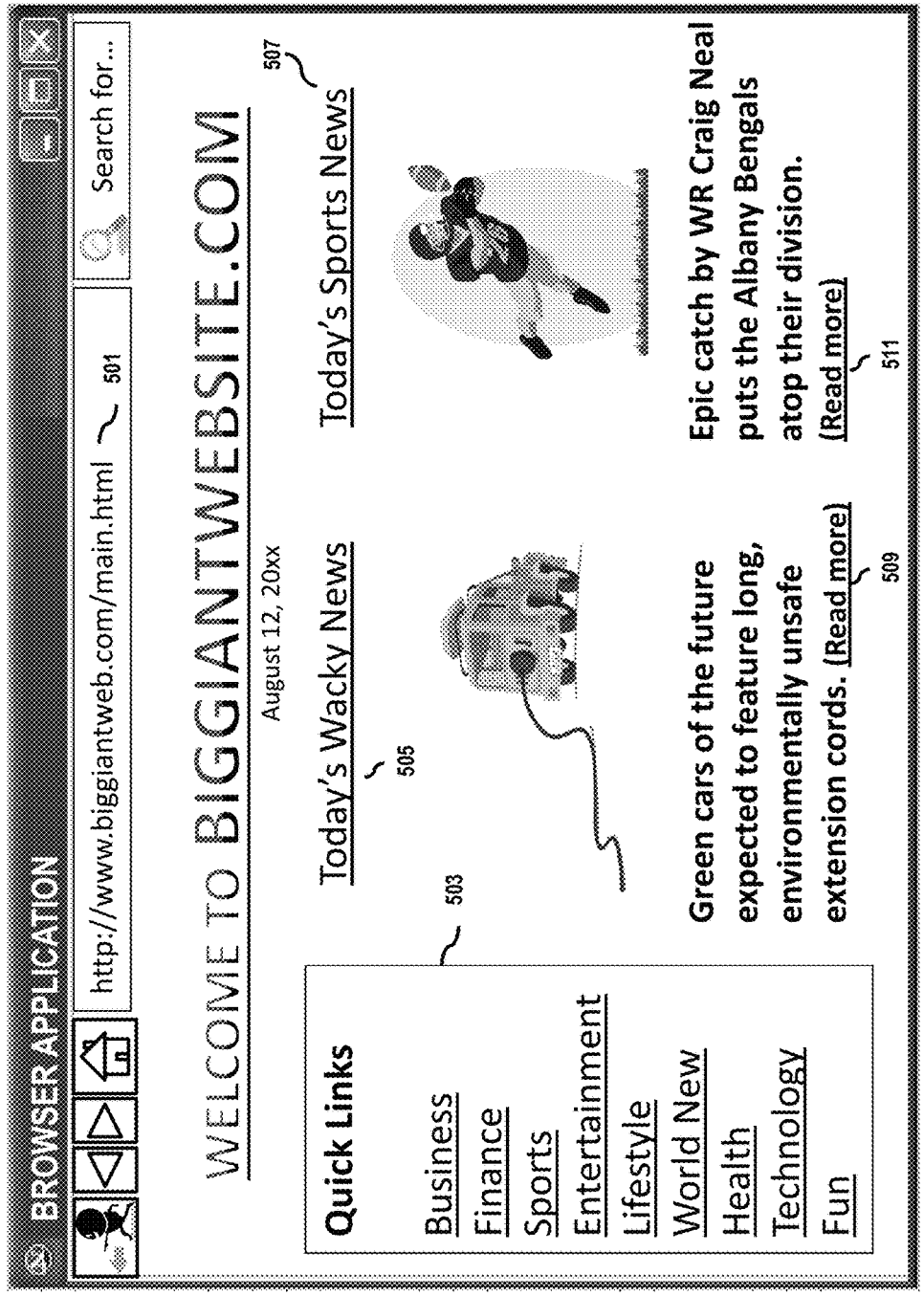
FIGS. 5A-5F are diagrams of a user interface for enabling presentment of a navigation path as performed by a user over a network to facilitate rapid acquisition of content, according to various embodiments.

In FIG. 5A, a user invokes a browser application 500, which in turn causes retrieval of a homepage. In this case, the homepage is set to specify a resource identifier value 501 corresponding to "www.biggiantweb.com/main.html," which is the site for content provider BIGGIANTWEB-SITE.COM. By way of example, the website features various content including pictures, text and additional resource identifiers for accessing other related content. The resource identifiers include a set of "Quick Links" 503 to content pertaining to various topics, general topic heading links 505 and 507 for accessing multiple articles pertaining to "Today's Wacky News" and "Today's Sports News" respectively, and links 509 and 511 respectively for accessing full articles relating to Wacky News and Sports News. It is noted that the content is up-to-date and corresponds to the date of access the browser session by the user of Aug. 12, 20xx.

Figure 5B:
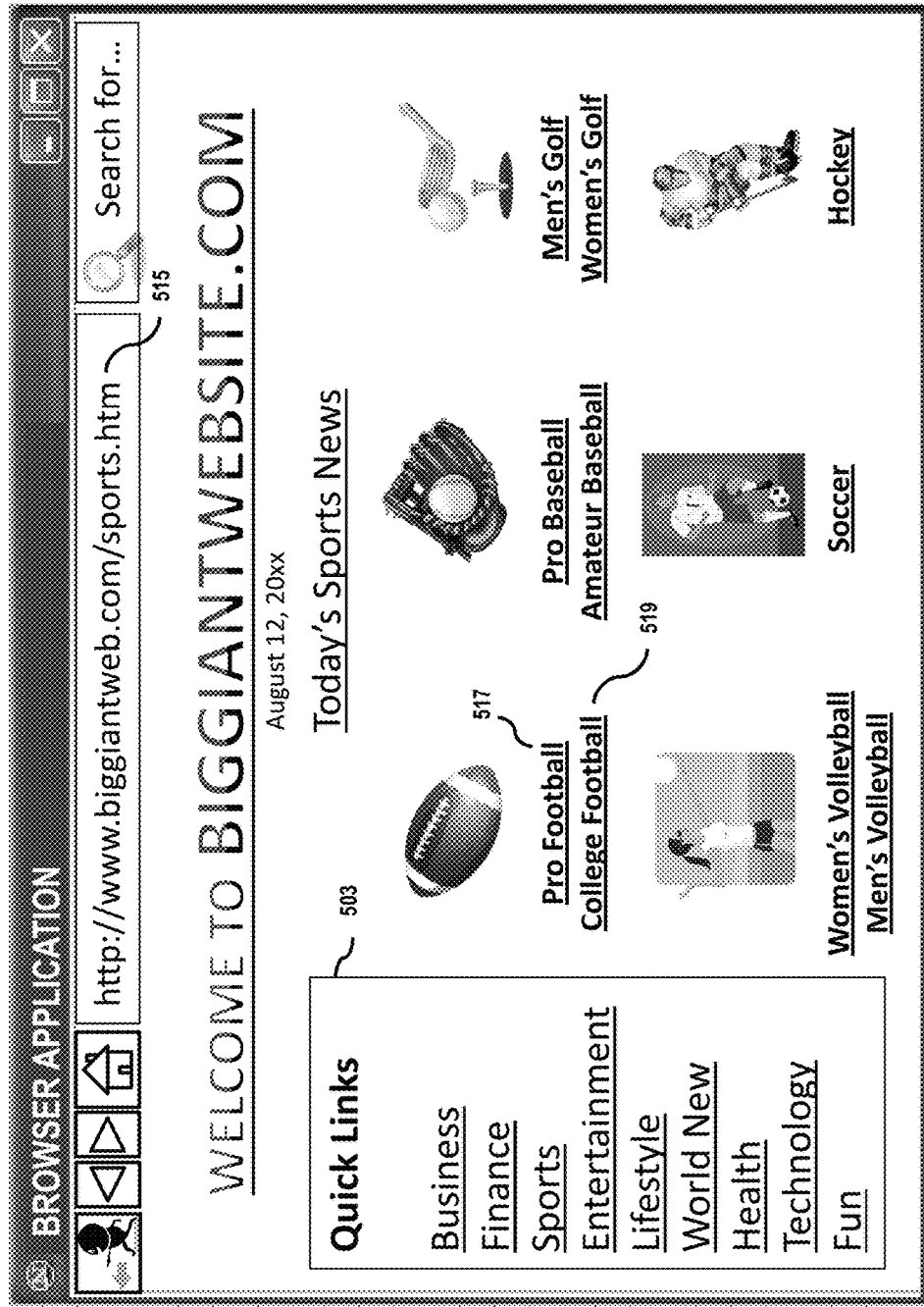
Figure 5C:
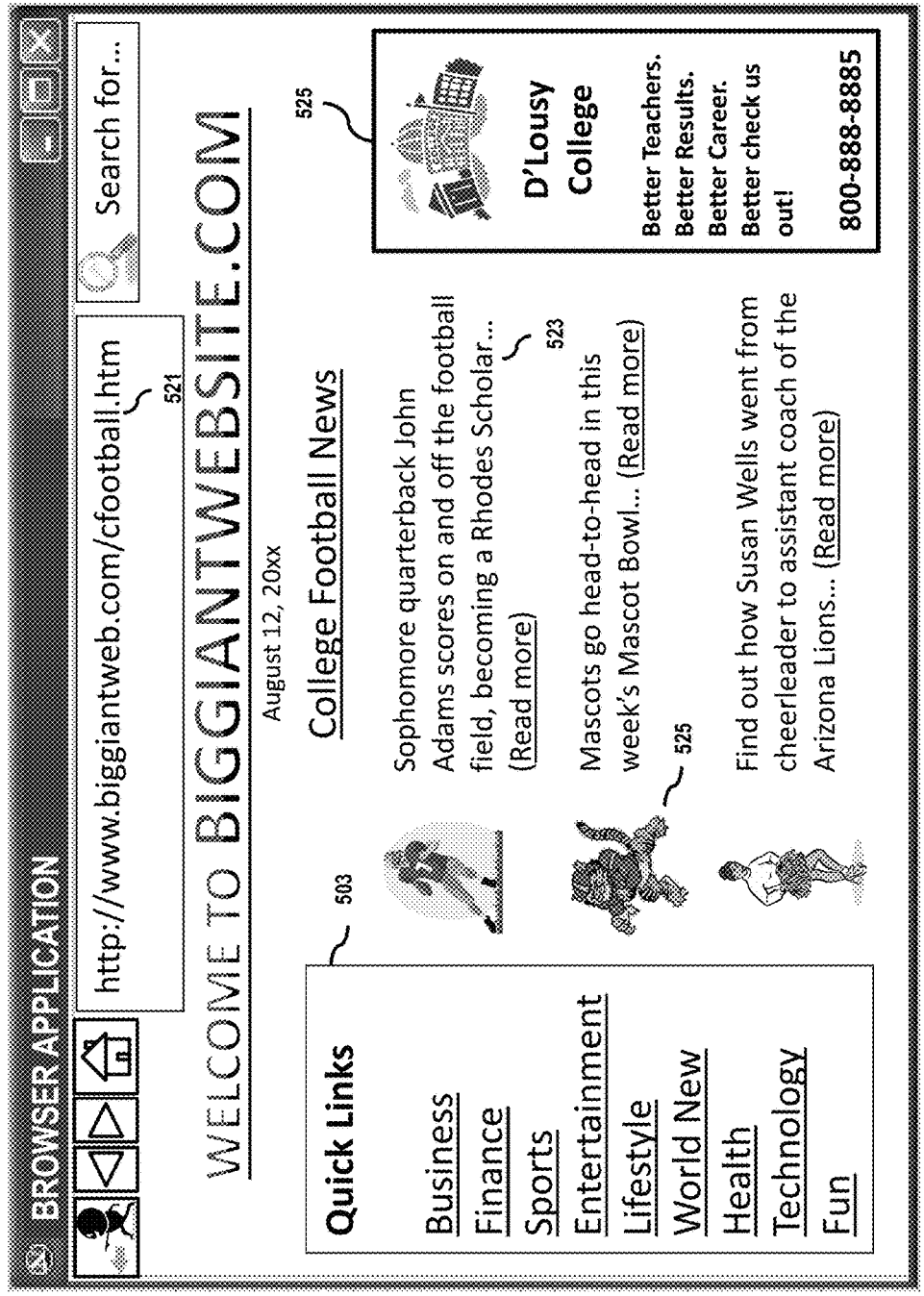

When the user selects (e.g., clicks) the "Today's Sports News" link 507, another resource identifier 515 value (shown in FIG. 5B) corresponding to "www.biggiantweb.com/sports.htm" is activated. This results in the retrieval of content pertaining sports news of multiple categories, including football, baseball, golf, volleyball, soccer and hockey. For each of these categories, additional resource identifiers for retrieving content of specific interest are also presented. By way of example, for the topic/category of football, the user has the option of selecting an "Pro Football" link 517 or a "College Football" link 519. After browsing through the categories for a period of time, the user then selects the "College Football" link 519, which retrieves content pertaining to this subject matter as shown in FIG. 5C.

The content retrieved is referenced by a resource identifier 521 value corresponding to "www.biggiantweb.com/cfootball.htm" for presenting links (e.g., 521 and 523) to various articles pertaining to college football. In addition, the content also includes a selectable advertisement link 425 for a college, wherein the link references a resource identifier 525 value corresponding to "www.dlousycollege.edu/main.htm." Upon selecting this link 525, the homepage of D'Lousy College is retrieved for presentment to the browser 500. It is noted that the resource identifier 525 retrieving content pertaining to D'Lousy College is unrelated to resource identifiers 501, 515 and 521, which are all related to BIGGIANTWEBSITE.COM.

Figure 5D:
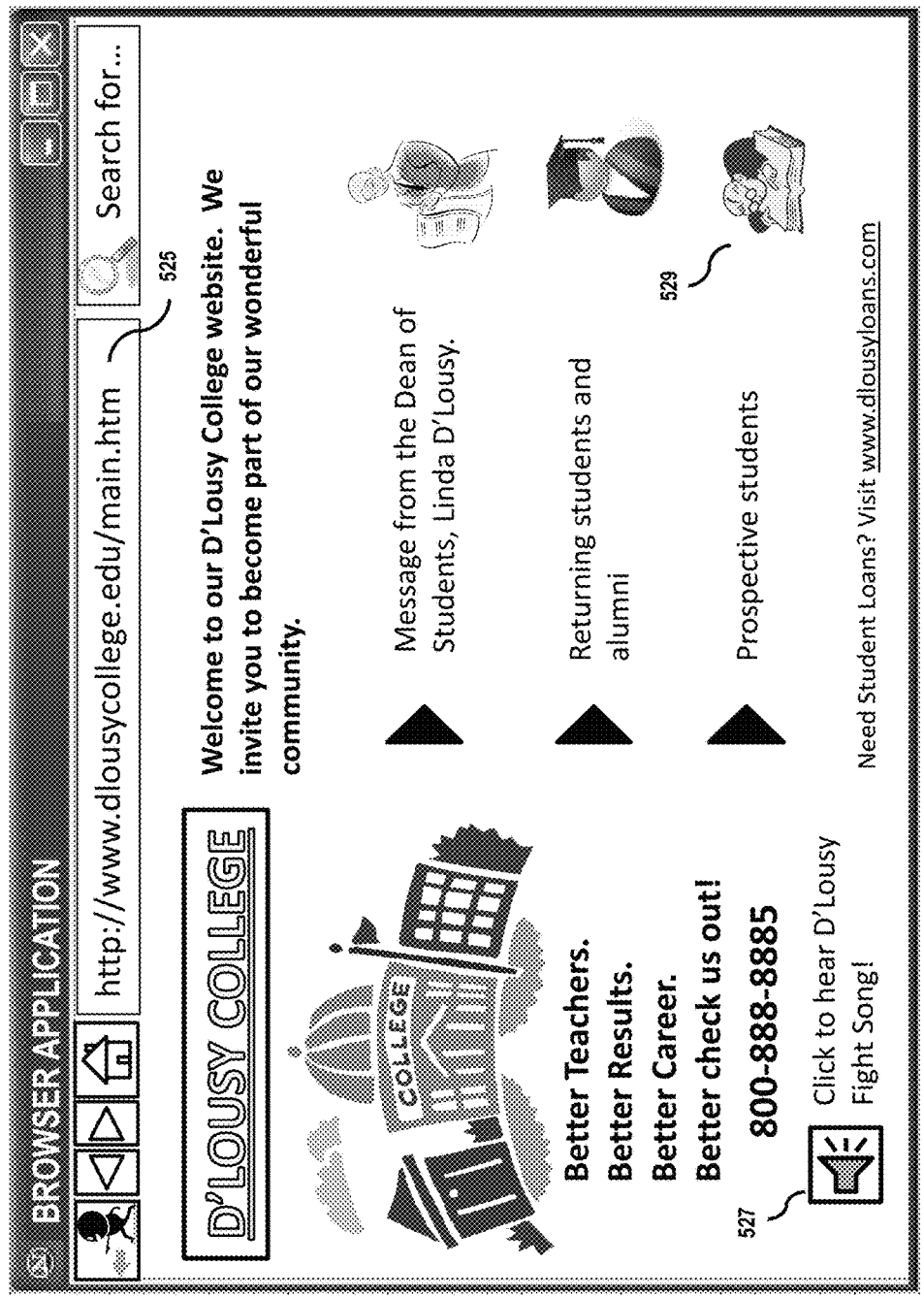

By way of example, in FIG. 5D, the user is presented with various links for accessing further topics/content of interest pertaining to the college. The user may select a link 527 for activating an audio file, which causes execution of a media player at the user device 101a-101n.

It is noted that while the resource identifier value for retrieving the media clip entitled "D'Lousy_Fight_Song.wav" was retrieved, no webpage transition occurs. Hence, from the same page that corresponds to identifier value 525, the user selects a resource identifier 529 for retrieving content providing information regarding prospective students. This results in presentment of another page featuring content pertaining to prospective students (not shown). For example purposes, the resource identifier value for the prospective students page is "www.dlousycollege.edu/prospectives.htm." The user then ends their browsing session, by closing the browser 500 or minimizing the browser for a period of time, after having navigated to the content of interest. It is noted further, by way of example, that while the user does not bookmark the resource identifier referencing this content of interest, the navigation path platform tracks the navigation path traversed during this session.

Figure 5E:
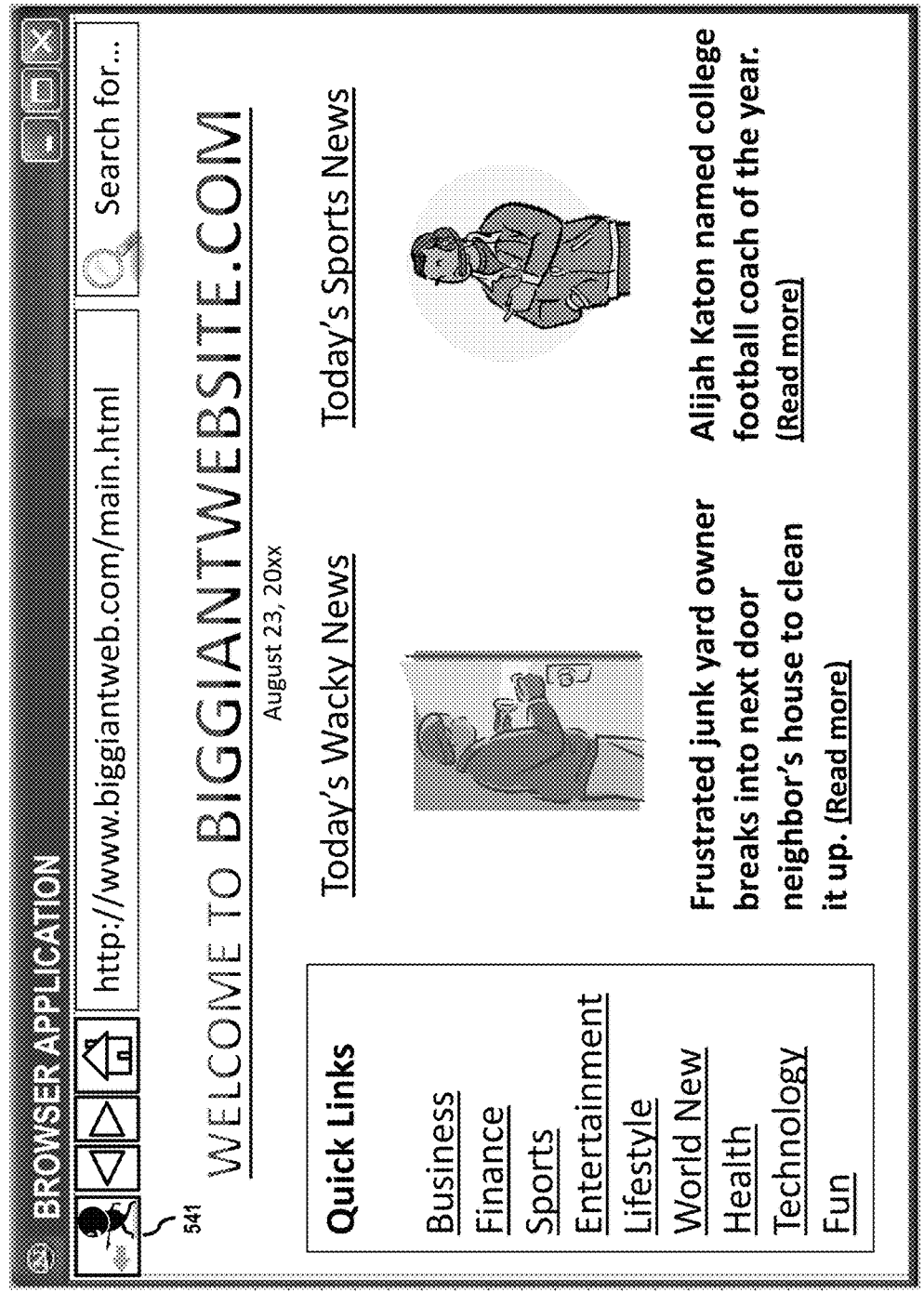
Figure 5F:
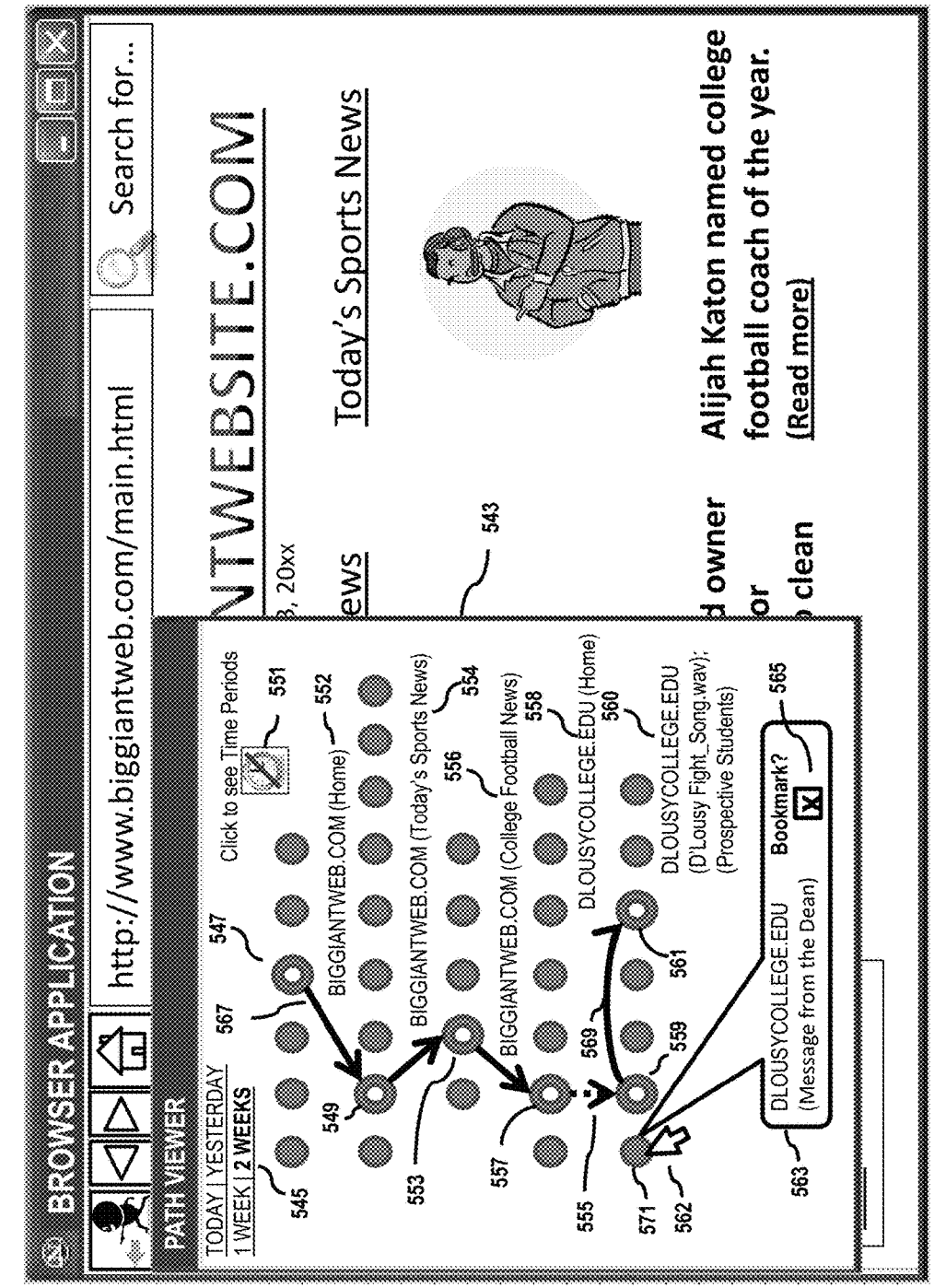

In FIG. 5E, the user decides to access their browser 500 to engage a web browsing session on Aug. 23, 20xx, ten days after (within two weeks of) the above described session. Having decided to pursue a higher education, the user wants to access the content they viewed previously, but they cannot recall the name of the school, the specific resource identifier value or any other identifying information. Thus, the user decides to submit a request at the browser application 500, in connection with the navigation path process 103, for presentment of a prior executed navigation path. By way of example, the user selects a path viewer action button 541, which results in the invocation of a data view 543 as shown in FIG. 5F, referred to herein as a path viewer 543.

When the user selects the time frame "2 WEEKS" 545, they are presented with a graphical representation of a navigation path comprising various nodes (e.g., 547) for representing specific resource identifiers, route indicators (e.g., arrow 555, arrow 567) for representing a path from one identifier to another and metadata 552-560 for describing the resource identifiers as traversed at varying drop down levels or in accord with varying sequences. A first node presented in the path viewer 543 informs the user that the point of origination of the depicted session was with respect to the resource identifier for the BIGGIANTWEB.COM homepage. As per FIG. 5A, several additional nodes are also presented adjacent to this node, which are representative of the various additional links capable of being invoked from the home page. Associated metadata 552 pertaining to this node is also shown. It is noted that node 547 may be clicked upon by the user for causing retrieval of content corresponding to resource identifier value 501 as shown in FIG. 5A.

A route indicator 567 then points to another node 549 accessed in the past by the user during this session, along with various other nodes for representing resource identifiers associated with the same page. Associated metadata 554 is presented as well. As per the use case described above, the node represents resource identifier value 515 for retrieving content as shown in FIG. 5B ("Today's Sports News) of BIGGIANTWEB.COM. Nodes 553 and 557, corresponding to resource identifier values 521 and 525 of FIGS. 5C and 5D respectively are also shown as having been accessed by the user, the nodes being presented adjacent to other nodes associated with the same pages respectively. Associated metadata 556 and 558 is also presented. It is noted that the route indicator 555 for representing the path traversed from node 557 to 559 is different in appearance (e.g., dashed) to indicate an unrelated resource identifier was accessed. As mentioned previously, this corresponds to navigation from the web page of content provider BIGGIANTWEB.COM to that of DLOUSYCOLLEGE.EDU.

As noted, the navigation path also depicts the nodes 559 and 561, which corresponds to resource identifiers 527 and 529 for retrieving content pertaining to the D'Lousy Fight Song and prospective students respectively. Associated metadata 560 is also shown. By way example, a route indicator 569 is shown for indicating to the user via the path viewer 543 the sequence in which the mutually embedded links at the college website were retrieved. Of note, the arrows may in certain instances be presented in unidirectional fashion to illustrate back and forth movement between respective resource identifiers. Alternatively, the user may be presented with an action button for allowing the view to disable repeating or redundant reference identifier navigation.

The path viewer 543, operating in connection with the navigation process 103, may also be may be configured to enable mouse over data views. When the user moves the mouse reference icon 562 over a particular node without clicking it, a data view 563 is presented for indicating the specific resource identifier the node corresponds to. By way of example, when a mouse over is performed with respect to node 571, the data view 563 is shown to indicate the node is a reference to a resource identifier for accessing a message from the Dean of D'Lousy College. From this data view 563, the user can bookmark the specific resource identifier by providing input at a bookmark selection field 565. Still further, in certain embodiments, the user may also activate or deactivate a time period setting 551 that is configured to present time data associated with respective of the selected nodes 547-561. This option may be employed by the user for narrowing down navigation path results in instances where a broader time frame 545 is insufficient for enabling ready user identification of content of interest.

It is noted that the path viewer 543 as presented with respect to FIG. 5F for displaying a navigation path may be considered a full view. A consolidated or collapsed view representative of the data, as shown in TABLE 1, may be presented via the viewer 543 as follows:

TABLE 1

Exemplary collapsed view of a navigation path

BIGGIANTWEB.COM (Home)→(Today's Sports News)→(College Football News)-->
DLOUSYCOLLEGE.EDU (Home)→(D'Lousy_Fight_Song.wav)→(Prospective Students).

Under this scenario, it may be noted that only textual information representative of the navigation path is presented.

The exemplary techniques and systems presented herein enable immediate tracking and presentment of a navigation path traversed during a browser session. In one embodiment, the navigation path platform renders a visual representation of the navigation path to the browser application in response to a query request. The navigation path as presented is depicted as one or more resource identifiers, interconnected in such as way as to represent the sequence of said resource identifiers for acquiring content of interest to the user. This execution may be performed with respect to any of the resource identifiers presented in connection with the navigation path, thus enabling a user to quickly review the entire domain of results correlating to the path during a prior browsing session.

The above processes and arrangement, in certain embodiment, advantageously provide convenient, effective access to content associated with prior navigation paths.

The processes described herein for tracking and presenting navigational paths may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
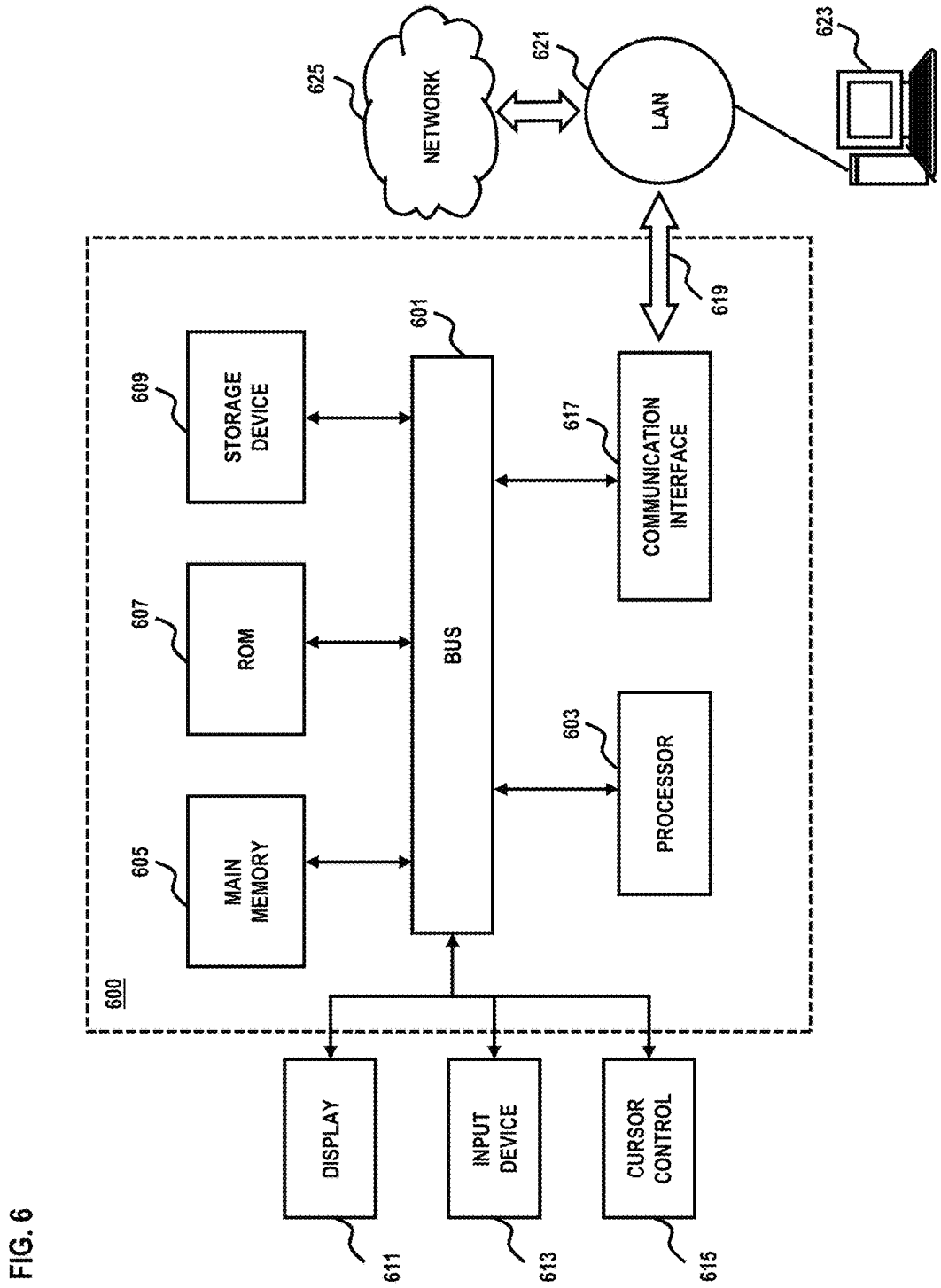
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5F, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
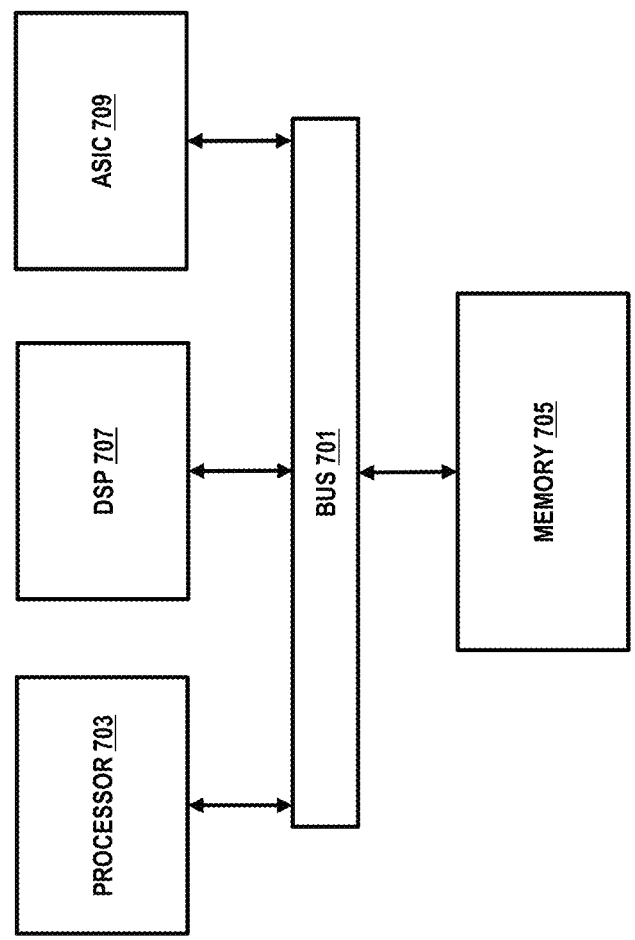
FIG. 7 is a diagram of a chip set that can be used to implement an embodiment of the invention.

FIG. 7 illustrates a chip set or chip 700 upon which an embodiment of the invention may be implemented. Chip set 700 is programmed to enable presentment of a navigation path as performed by a user over a network to facilitate rapid acquisition of content as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling presentment of a navigation path as performed by a user over a network to facilitate rapid acquisition of content.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable presentment of a navigation path as performed by a user over a network to facilitate rapid acquisition of content. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   presenting a navigation path representing one or more sequences of resource identifiers that are related based on selection information provided by a user in navigating, via a browser application, the resource identifiers of the one or more sequences of the navigation path,
   wherein the navigation path is presented to permit direct selection of one of the resource identifiers of the one or more sequences for acquiring content associated with the selected resource identifier, and
   wherein the navigation path is presented as route indicators directly linking nodes corresponding to specific resource identifiers that were selected by the user, and
   wherein at least one route indicator linking nodes that were selected by the user is displayed different in appearance to indicate that a subsequently linked node corresponds to a resource identifier that is unrelated to the resource identifier of the node from which it is immediately linked.

2. A method according to claim 1, further comprising:
   invoking the browser application;
   receiving, via the browser application, a query for content; and
   selecting the navigation path for presentation in response to the query.

3. A method according to claim 2, wherein the resource identifiers include search results corresponding to the query.

4. A method according to claim 1, wherein the navigation path is structured according to a predetermined number of drill down levels.

5. A method according to claim 4, wherein the sequences begin at different ones of the drill-down levels and include at least one non-common resource identifier.

6. A method according to claim 4, wherein the navigation path includes search resource identifiers that are not a part of the one or more sequences.

7. A method according to claim 6, wherein the resource identifiers and the search resource identifiers are presented according to the drill-down levels as either an expanded form or an collapsed form.

8. An apparatus comprising:
   at least one processor; and
   at least one memory including computer program code for one or more programs,
   the at least one memory and the computer program code configured to, with the at least one processor, cause the apparatus to perform at least the following,
   present a navigation path representing one or more sequences of resource identifiers that are related based on selection information provided by a user in navigating, via a browser application, the resource identifiers of the one or more sequences of the navigation path,
   wherein the navigation path is presented to permit direct selection of one of the resource identifiers of the one or more sequences for acquiring content associated with the selected resource identifier, and
   wherein the navigation path is presented as route indicators directly linking nodes corresponding to specific resource identifiers that were selected by the user, and
   wherein at least one route indicator linking nodes that were selected by the user is displayed different in appearance to indicate that a subsequently linked node corresponds to a resource identifier that is unrelated to the resource identifier of the node from which it is immediately linked.

9. An apparatus according to claim 8, wherein the apparatus is further caused to:
   invoke the browser application,
   receive, via the browser application, a query for content; and
   select the navigation path for presentation in response to the query.

10. An apparatus according to claim 9, wherein the resource identifiers include search results corresponding to the query.

11. An apparatus according to claim 8, wherein the navigation path is structured according to a predetermined number of drill down levels.

12. An apparatus according to claim 11, wherein the sequences begin at different ones of the drill-down levels and include at least one non-common resource identifier.

13. An apparatus according to claim 11, wherein the navigation path includes search resource identifiers that are not a part of the one or more sequences.

14. An apparatus according to claim 13, wherein the resource identifiers and the search resource identifiers are presented according to the drill-down levels as either an expanded form or an collapsed form.

15. A method comprising:
   tracking a navigation path specifying a plurality of resource identifiers associated with user selections of the resource identifiers in response to a single query;
   storing the navigation path among a plurality of navigation paths corresponding to other queries; and
   retrieving one of the navigation paths in response to a user input,
   wherein the navigation path is presented as route indicators directly linking nodes corresponding to specific resource identifiers that were selected by the user, and
   wherein at least one route indicator linking nodes that were selected by the user is displayed different in appearance to indicate that a subsequently linked node corresponds to a resource identifier that is unrelated to the resource identifier of the node from which it is immediately linked.

16. A method according to claim 15, further comprising: presenting the one navigation path in response to invocation of a browser application.

17. A method according to claim 16, wherein the navigation path is presented to permit direct selection of one of the resource identifiers for acquiring content associated with the selected resource identifier.

18. A method according to claim 16, wherein the navigation path represents one or more sequences of the resource identifiers that are related based on selection information provided by the user in navigating via the browser application.

* * * * *